Aug. 19, 1930.    L. J. GRUBMAN    1,773,139

BELLOWS AND METHOD OF ASSEMBLING THE PARTS THEREOF

Original Filed Sept. 6, 1924    2 Sheets-Sheet 1

INVENTOR
Leo J. Grubman
BY
ATTORNEY

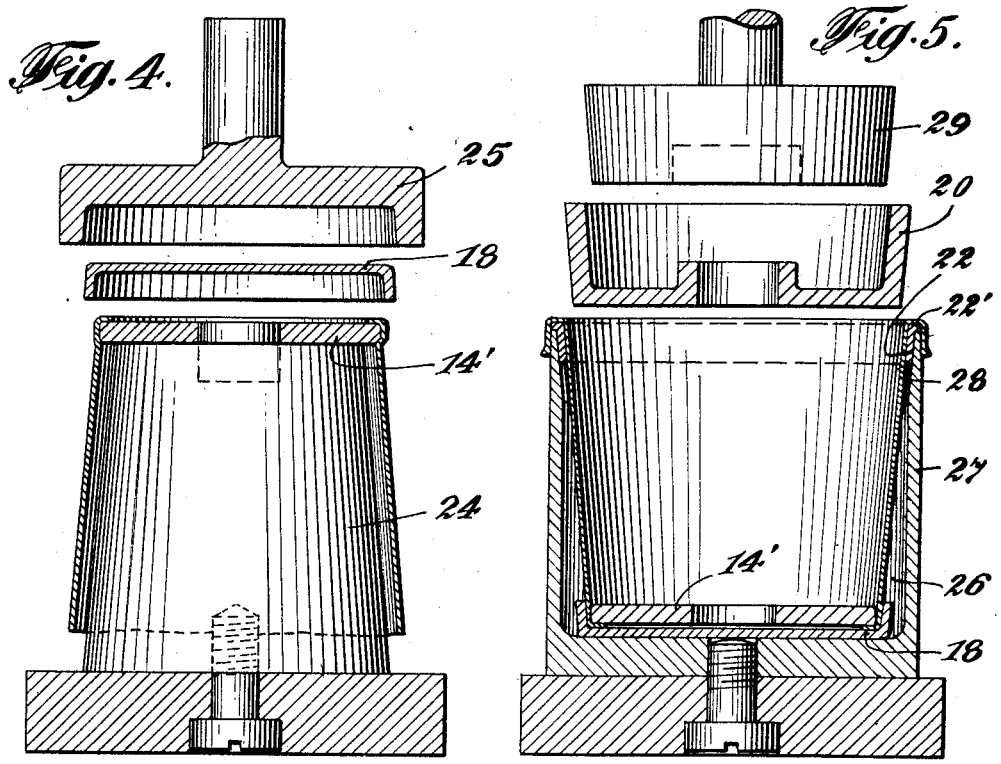
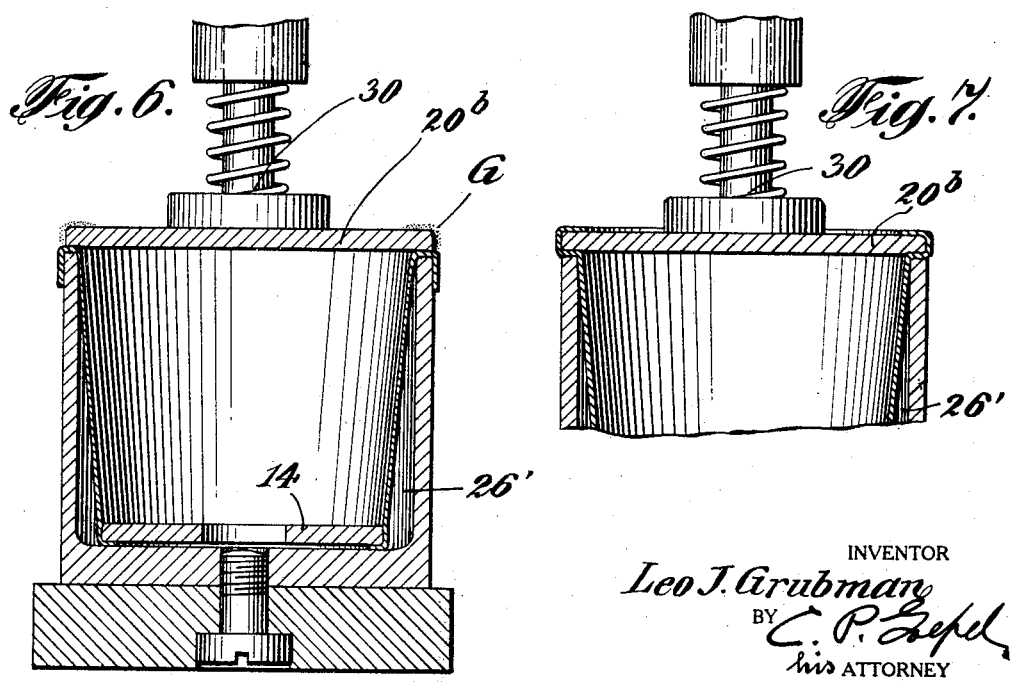

Patented Aug. 19, 1930

1,773,139

UNITED STATES PATENT OFFICE

LEO J. GRUBMAN, OF BELLE HARBOR, NEW YORK, ASSIGNOR TO VOICES, INCORPORATED, OF NEWARK, NEW JERSEY, A CORPORATION OF DELAWARE

BELLOWS AND METHOD OF ASSEMBLING THE PARTS THEREOF

Application filed September 6, 1924, Serial No. 736,253. Renewed July 14, 1928.

This invention relates to an improved bellows and method of assembling the parts thereof and has for its primary object to provide an improved bellows construction of cylindrical form, such as is used in connection with sound producing devices or "voices" for talking dolls or other toys, and a method for expediting the assemblage of the several parts or elements of such a bellows which may thereafter be readily arranged in proper cooperative relation with the other parts of the sound producing device.

Briefly stated, the essential and distinguishing feature of the new method resides in that step thereof whereby a head for the bellows is assembled with one end of a tubular flexible bellows wall of frustro-conical form and connected in air tight relation therewith. This step of the method is carried out after a suitable head has been attached to or connected with the other end of the tubular bellows wall and consists in inserting the latter head and the tubular wall within a cylindrical chamber and then turning the other end edge of the tubular bellows wall outwardly over the upper edge of the chamber wall and finally applying a second head upon the latter end of the bellows wall and securing the end edge of the bellows wall to the circumferential face of said head.

In this manner, I am enabled to produce a bellows of tubular cylindrical form with the flexible body wall thereof at its opposite ends surrounding the respective heads and having an air-tight connection with the circumferential faces thereof.

It is also an important object of my invention in one embodiment thereof, to provide a bellows construction of this type wherein one of the bellows heads has a tapering circumferential surface and is inserted under pressure within one end of the tubular bellows wall which is engaged within an annular tapering clamping ring whereby a very tight wedging frictional clamping pressure is produced between said flexible bellows wall and the inner and outer surfaces of said ring and head respectively to produce an effective air-tight seal between said head and the interior of the bellows.

With the above and other objects in view, the invention consists in the improved bellows and the method of assembling the component parts thereof, which will be hereinafter more fully described, illustrated in the accompanying drawings and subsequently incorporated in the subjoined claims.

In the drawings wherein I have illustrated several simple and satisfactory embodiments of the invention and in which similar reference characters designate corresponding parts throughout the several views:

Figure 4 is a sectional view illustrating one step of my improved method whereby the flexible cylindrical walls of the bellows is secured to the fixed head thereof;

Figure 5 is a similar view illustrating the method step of securing the movable bellows head to the other end of the cylindrical wall thereof; and Figures 6 and 7 are similar views illustrating an alternative method of securing the flexible bellows wall to the movable head.

Figure 1:
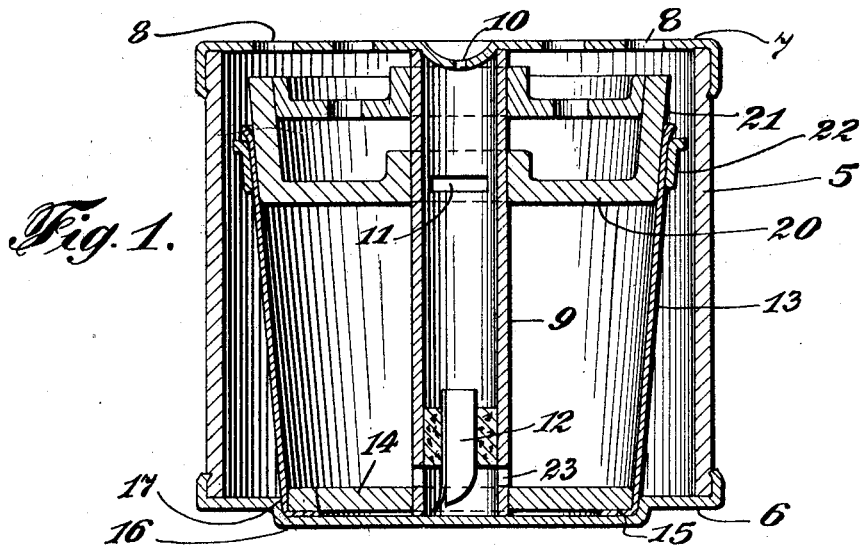
Figure 1 is a vertical sectional view through a sound producing device or "voice" having a bellows constructed in accordance with the preferred embodiment of the invention.

Referring in detail to the drawings, in Figure 1 thereof I have illustrated a sound producing device or "voice" for dolls and other toys corresponding in a general way with the device shown and described in my pending application for patent, Ser. No. 542,884, filed March 11, 1922. As shown in said application, the operative parts of the device are entirely contained or encased within a cylindrical shell or casing 5 which may be made of heavy cardboard or other suitable material and is adapted to be mounted within the body of the doll or toy in any convenient or approved manner. This casing at one of its ends is provided with an imperforate sheet metal cap or closure plate 6 and at its other end with a similar cap or closure plate 7 having suitably arranged spaced openings 8 therein for the egress of sound from the interior of said casing.

A post 9 extends between the closure caps 6 and 7 of the casing 5 and is suitably fixed in co-axial relation with said casing. As herein shown, this post is of tubular form and the closure cap 7 is centrally provided with an orifice 10 communicating with one end of this tubular post. In spaced relation to said orifice, the wall of the tubular post is provided with a sound outlet and air inlet aperture 11. In the other end of said post and adjacent to the closure cap 6 for the casing the sound producing reed 12 is suitably mounted.

Within the casing 5, a cylindrical bellows is co-operatively associated with the tubular post 9. This bellows in one embodiment thereof consists of a flexible cylindrical body wall 13 of a suitable semi-elastic material which preferably tapers or gradually decreases in diameter from one end to the other thereof. As shown in Figure 1 of the drawings, a disc 14 is inserted within the smaller end of the bellows wall 13, the end edge of said wall being turned over the edge of the disc upon one side face thereof, as indicated at 15. This disc or head 14 is secured in fixed relation to the end cap 6 of the casing 5, and for this purpose I have shown said end cap provided with an outwardly pressed portion 16 which affords an interior circular recess and provides the annular shoulder 17 at the outer side thereof. The parts are very accurately formed so that by forcing the head or disc 14 and the end edge of the bellows wall 13 connected therewith, into said recess of the cap 6, said head 14 acts to very tightly clamp the flexible bellows wall between its circumferential surface and the shoulder 17.

Figure 2:
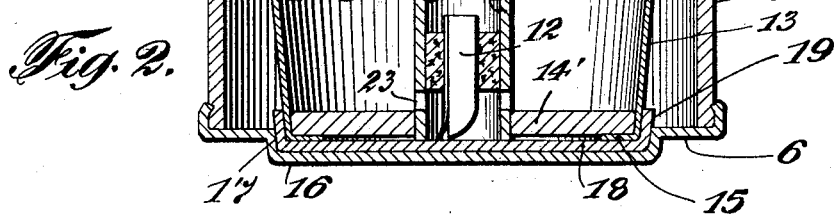
Figure 2 is a similar fragmentary sectional view showing a slightly different means for fixing one end of the cylindrical bellows wall to the end plate or cap on the casing of the sound producing device.

In Figure 2 of the drawings, I have shown an alternative form of this fixed end of the bellows wherein the bellows is a complete unit in itself and independent of the end cap 6 of the casing. Thus after the edge of the flexible bellows wall has been turned over the marginal edge of the head 14′, a clamping member 18 is then inserted over the end of the bellows wall in the manner which will be more fully referred to in connection with my improved method of assembling the parts as illustrated more particularly in Figure 4 of the drawings. This member 18 is in the form of a metal plate having an outwardly flaring or angularly disposed annular flange 19. In this case, the periphery of the disc 14′ is also correspondingly tapered to co-operate with the flange 19 and thereby frictionally bind or clamp the flexible bellows wall between the edge face of said disc and said flange. In assembling this end of the bellows with the end plate or cap 6, of the casing the member 18 is positioned in the recess formed by the projected wall 16 of said cap and when the tubular post 9 is inserted through the central opening of the head 14′ and against the member 18, the latter is held against displacement from said recess as will be evident from reference to Figure 2 of the drawings.

Figure 3:
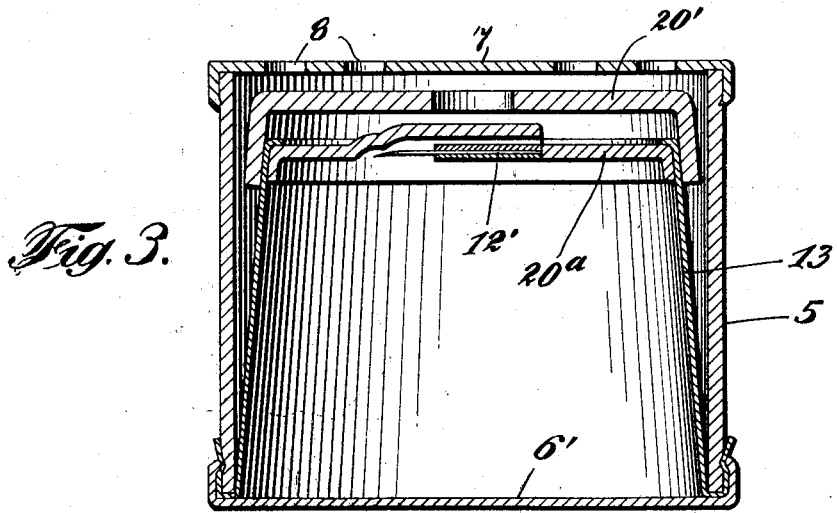
Figure 3 is a vertical section similar to Figure 1, showing an alternative form of the movable head of the bellows and another manner of securing the fixed end of the flexible bellows wall in position.

To the other or larger end of the cylindrical bellows wall 13, the gravity movable air expelling head is secured. As shown in Figure 1 of the drawings, this head 20 is of a tapering form, and consists of two nested sections each having a central opening to loosely receive the tubular post 9 so that said head may have free sliding movement thereon. These nested sections of the head each co-operate with the sound outlet aperture 11 to effect a proper articulation of the sound in the collapsing movement of the said bellows head. However, a head of this specific construction is not essential in carrying out my present improvements, and various other alternative forms thereof might be provided, such for instance, as that shown in the application above referred to or as seen in Figure 3 of the present drawings. The head 20 is of such external diameter that it is necessary to force said head within the larger end of the cylindrical bellows wall under considerable pressure whereby the external tapering surface 21 of said head will co-operate with the inner surface of the end portion of the bellows wall and tend to distend the same. In the construction illustrated in Figure 1 of the drawings, such distending force applied by the head 20 to the flexible bellows wall is resisted by a substantially non-expansible clamping ring or annulus 22 which likewise is of tapering form and surrounds the bellows head 20. The difference between the external diameter of said head and the internal diameter of the ring 22 is slightly less than the normal thickness of the flexible bellows wall 13. Thus it will be evident that in forcing the head 20 within the end of the cylindrical bellows wall to the limit of its movement while the ring 22 is held in a stationary position, the opposed tapering surfaces of said head and the ring exert a compressing action upon the flexible material of the bellows wall, and thus produce a substantially uniform and very tight frictional clamping of such surfaces against the inner and outer sides of the flexible wall at all points around the head 20.

It will be understood that the fixed head or disc 14 of the bellows has a central opening through which one end of the tubular post 9 is engaged and this post adjacent said head is provided with one or more openings 23 through which air is expelled in the gravity collapsing movement of the head 20 from the interior of the cylindrical bellows into the end of the post 9 and hence through the sounding reed 12. Such a sound producing device as used in connection with talking dolls operates to effect an articulation of the sound and produce a realistic simulation of the infant cry "ma-ma". Since the operation of devices of this character is now well known in the art, a further detail statement thereof is unnecessary in so far as the novel features of my present disclosure are concerned.

In Figure 3 of the drawings I show an alternative form of the device wherein the tubular guide post for the gravity movable bellows head is omitted and in this case the end of the flexible bellows wall of smaller diameter, is frictionally clamped or held between the tapering marginal flanges of the two telescoping sections 20' and 20ª respectively of the bellows head. In this case the flexible bellows wall is assembled with the parts of the movable head in the same manner as the bellows wall is secured to the fixed head above described in connection with Figure 2 of the drawings. In other words, the inner section 20ª of the head is arranged upon a suitable support and the end edge of the flexible bellows turned inwardly over the marginal flange of said head section. The other section 20ª of the head is then applied under pressure against the outer surface of the end portion of the bellows wall whereby the latter is frictionally clamped and held between the marginal flanges of said head sections. The reed 12' is carried by the inner head section 20ª. This device is merely a crier, and there is no articulation of the sound simulating the pronunciation of word syllables.

In this alternative construction, the other or larger end of the cylindrical flexible bellows wall is turned outwardly around the end edge of the casing wall 5 and is frictionally clamped and held thereon by the cap plate 6' extending over one end of the casing. No claim is made herein to this feature as it is fully disclosed and claimed in my co-pending application, Ser. No. 601,725 filed November 18, 1922 (now Patent No. 1,507,826, dated September 9, 1924). However, the method of assembling a flexible bellows wall of frustro-conical form with the end heads or closures as shown in the said issued patent is claimed in this application, and as to such subject matter for all statutory requirements, and purposes of priority, applicant relies upon the filing date of the first named application, namely, November 18, 1922.

In each of the constructions above described, it will be seen that the end of the flexible bellows wall is assembled with the movable head and fixedly secured in air tight connection therewith between opposed tapering frictional clamping surfaces engaging the inner and outer faces of said flexible wall.

In Figure 4 of the drawings I have illustrated that step of the method whereby the smaller end of the flexible cylindrical bellows wall is connected to the stationary or fixed head, as seen in Figure 2 of the drawings. Thus the disc 14' is arranged upon the upper end of a suitable pedestal or support 24. The disc is of greater diameter than the outer surface of this pedestal and projects beyond the edge thereof. The flexible cylindrical wall of the bellows is then drawn downwardly over this disc 14' until the disc is engaged in the smaller end thereof with a tight frictional fit whereby said end of the flexible wall is distended. In forcing the disc 14' into the end of the tubular bellows, the end edge of the flexible bellows wall naturally turns inwardly over the upper surface of said disc or head. The member 18 is then positioned over this inturned edge of the flexible wall and pressure is applied thereto by means of the plunger 25 actuated by any suitable mechanism or by hand so as to force said member downwardly and thereby cause its annular marginal flange to exert an inward frictional pressure against the outer side of the end edge portion of the flexible wall of the bellows and thus frictionally clamp and hold said end of the bellows wall between said flange and the disc 14'.

After the head, composed of the elements 14 and 18, has been applied to one end of the cylindrical bellows wall, said head and the flexible bellows wall are then inserted into a cylindrical chamber 26, said bellows head resting upon the bottom surface of said chamber. The inner surface of the wall 27 of the chamber 26 at its upper end has an annular outwardly flaring or inclined section 28. The tapered ring 22 above referred to is provided upon one edge with an outwardly projecting flange 22' and this ring is adapted to be arranged within the upper end of said chamber 26 with its outer face in contact with the inclined surface 28 on the chamber wall and the flange 22' of said ring resting upon the upper edge of said wall. This clamping ring is of course, assembled upon the upper end of the chamber wall 27 prior to placing the bellows in said chamber. The end of the flexible bellows wall thus extends upwardly through said ring and as shown in Figure 5 of the drawings, is turned outwardly over the flange 22 and upon the outer face of the wall 27. The tapering head 20 is then placed within this upper open end of the cylindrical bellows wall and pressure is applied thereto by means of the plunger 29 so as to force said head downwardly, thereby causing this outer tapering or inclined circumferential face to coact with the inner surface of the flexible bellows wall and thus tightly compress and frictionally bind said wall between the opposed tapering surfaces of said head and the ring 22, as above explained. After this second head has been thus applied, the bellows is removed from the chamber 27 and the surplus end portion of the flexible bellows wall extending outwardly beyond the ring 22 is trimmed off, as will be seen from reference to Figure 1 of the drawings.

In Figures 6 and 7 of the drawings, I illustrate a slightly different method of applying the movable bellows head to the flexible cylindrical wall wherein the end of the flexible wall surrounds said head in the same manner as in the construction shown in Fig. 1, but in which the use of a frictional clamping ring such as heretofore referred to, is dispensed with and in lieu thereof, glue or other suitable adhesive is used. In this case, after the smaller end of the flexible bellows wall has been connected to the disc 14 which is to be fixed within the enclosing casing, said disc and the flexible wall are arranged within a chamber 26' in the same manner as shown in Figure 5. The flexible wall at its other or larger end is then turned outwardly over the upper edge of the chamber wall and the other bellows head 20ᵇ is positioned thereon, the outer edge of said head extending upon the part of the bellows wall engaged over the edge face of the chamber wall. While a holding pressure is applied upon the upper face of the head 20ᵇ by a suitable pressure device indicated at 30, the out-turned end edge of the bellows wall is drawn upwardly over the circumferential face of the head 20ᵇ to which a suitable glue or adhesive indicated at G, has been applied, such adhesive also extending over the marginal portion of the upper surface of said head. The edge portion of the flexible bellows wall extending beyond the edge of the disc is of sufficient width so that it may be folded inwardly and downwardly upon the upper surface of said head. Thus it will be understood that the marginal portion of the head will be enclosed within the end of the cylindrical bellows wall while the end edge of said wall is adhesively secured upon the outer edge surface and the upper face of the head.

From the foregoing description considered in connection with the accompanying drawings, my improved bellows and the new method of assembling the several parts thereof will be fully understood. In so far as I am aware, it is new in this art to arrange the flexible cylindrical bellows wall with its end edge turned outwardly over the end of the supporting wall and to then apply the bellows head upon the inner surface of said flexible wall and secure a section of said cylindrical bellows wall to the outer circumferential face of said head. In this manner, a secure air-tight connection may be effected while at the same time the assemblage of the parts is expeditiously performed whereby the quantity production of such devices at small manufacturing cost is realized. It will also be noted that in the construction illustrated in Figure 1 of the drawings, I avoid the angular bending of the end edge of the flexible bellows wall and frictionally clamp and hold said flexible wall between only two parallel tapered surfaces of the bellows head and the clamping ring. Thus the possible splitting or rupture of the flexible wall at the juncture of angularly related portions thereof is obviated whereby air leakage from the interior of the bellows is effectually prevented.

In the foregoing description and the accompanying drawings I have described and illustrated certain practical embodiments of the invention which will be found highly advantageous for use in connection with sound producing devices of the character referred to. However, it is possible that alternatives for both the bellows construction and the method of assembling the parts thereof embodying the essential features of my present disclosure might be devised and accordingly, I reserve the privilege of resorting to all such legitimate changes therein as may be fairly embodied within the spirit and scope of the invention as claimed.

I claim:

1. The method of closing the opposite ends of the frustro-conical flexible body wall of an air confining bellows which consists in first inserting a closure head within the smaller end of the frustro-conical bellows wall and turning the end edge of said wall inwardly over the marginal edge of said head and securing the same thereto, then positioning the flexible body wall of the bellows with said attached head within a cylindrical support and turning the other end edge of the flexible bellows wall outwardly over the edge of said support, and finally applying upon said out-turned end of the bellows wall a second closure head of relatively large diameter and securing said latter end edge of the bellows wall and said closure head in fixed relation to each other.

2. In combination, a casing, an air confining bellows unit having a tubular flexible body wall and heads closing the opposite ends of said tubular wall, said bellows unit adapted for insertion within said casing, and said casing having an end wall provided with means with which one of the bellows heads is adapted to be frictionally engaged to secure said bellows head in attached relation to said wall.

3. The method of assembling the parts of a bellows having a tubular flexible body wall which consists in mounting a tapered clamping ring upon the upper edge of a hollow support, then arranging said tubular body wall within said support and turning one end portion of said wall outwardly over the inner face of said ring and then inserting a closure head within said end of the tubular body wall to coact with said ring and thereby frictionally clamp and hold the end of said body wall between the opposed surfaces of said head and ring.

4. In combination, a casing provided with an end wall having an outwardly projected part providing an annular shoulder thereon, an air confining bellows unit adapted to be inserted within said casing and including a flexible collapsible body wall, and means cooperating with one end edge of said wall and with said annular shoulder to secure said end of the bellows wall in attached relation to said casing wall and effect an air tight seal between the casing wall and the bellows chamber.

5. In combination with a casing and a closure head for one end thereof, a sound producing device and a bellows within said casing for operating said device, said bellows including a frustro-conical body wall of flexible material, and heads of relatively different diameters closing the opposite ends of said flexible bellows wall, the said closure head for the casing having an annular wall within which one of the bellows heads is adapted to be forced under pressure to frictionally confine the end edge of the bellows material between said head and said annular wall.

6. In combination with a casing and a closure head for one end thereof, a sound producing device and a bellows within said casing for operating said device, said bellows including a tubular flexible wall, closure heads attached to the opposite ends of said tubular wall, said closure head of the casing having a part angularly projecting from the plane thereof and one of the bellows heads having means frictionally engaged with said part to retain said bellows head and the casing head in fixed relation to each other.

7. The method of assembling the parts of a bellows having a frustro-conical flexible body wall, which consists in first inserting a closure head within and affixing the same to the smaller end of said body wall, then positioning said body wall within a tubular support and turning the other end of said flexible body wall over one edge of said support, and finally securing a relatively rigid member to the latter end of the flexible body wall to retain the same in radially distended relation with respect to the smaller end of said body wall.

8. In a method of assembling the parts of a bellows having a flexible tubular body wall, the steps which consists in first arranging said tubular body wall within a clamping ring and turning one end portion of said flexible wall over an end edge of the clamping ring and then applying a complementary clamping member in cooperative relation with said clamping ring and with respect to the flexible body wall to frictionally clamp and secure said flexible body wall between opposed surfaces of said clamping ring and member.

In testimony that I claim the foregoing as my invention, I have signed my name hereto.

LEO J. GRUBMAN.